(12) United States Patent
Kikuchi

(10) Patent No.: US 8,705,105 B2
(45) Date of Patent: Apr. 22, 2014

(54) INFORMATION PROCESSING APPARATUS, CONTROL METHOD, AND STORAGE MEDIUM

(75) Inventor: Hiroshi Kikuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 116 days.

(21) Appl. No.: 13/367,068

(22) Filed: Feb. 6, 2012

(65) Prior Publication Data

US 2012/0200889 A1    Aug. 9, 2012

(30) Foreign Application Priority Data

Feb. 9, 2011  (JP) ................. 2011-026358

(51) Int. Cl.
*G06F 15/00* (2006.01)
*G06F 3/12* (2006.01)
*G06K 1/00* (2006.01)
*G06K 15/00* (2006.01)
*G06K 15/02* (2006.01)
*G06F 3/14* (2006.01)

(52) U.S. Cl.
CPC ............... *G06K 15/00* (2013.01); *G06K 15/02* (2013.01); *G06F 3/14* (2013.01)
USPC ........................ 358/1.15; 358/1.13

(58) Field of Classification Search
CPC ...................................... G06K 15/00
See application file for complete search history.

(56) References Cited

U.S. PATENT DOCUMENTS

2005/0246631 A1* 11/2005 Mori et al. ............... 715/515
2010/0188679 A1*  7/2010 Nakagawa ............... 358/1.12

FOREIGN PATENT DOCUMENTS

JP    2010-171906 A    8/2010

* cited by examiner

*Primary Examiner* — Douglas Tran
(74) *Attorney, Agent, or Firm* — Canon USA Inc. IP Division

(57) ABSTRACT

An information processing apparatus outputs, when both bookbinding printing for outputting a book and a number of pages arranged on a surface of a sheet are set, a print product that a user can easily read by synchronizing an opening direction and an arrangement order.

18 Claims, 17 Drawing Sheets

FIG.5
"LEFTWARD OPENING" AND
"RIGHTWARD FROM TOP LEFT"
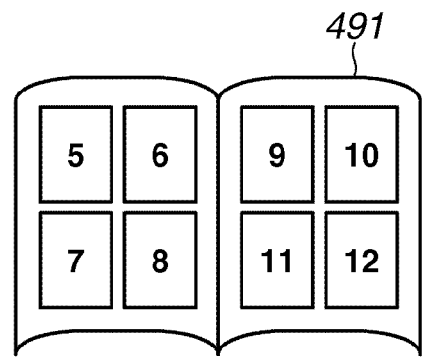
"RIGHTWARD OPENING" AND
"RIGHTWARD FROM TOP LEFT"
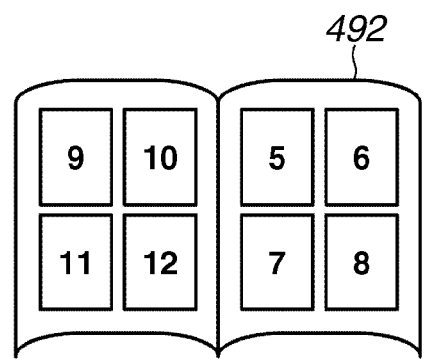
"RIGHTWARD OPENING" AND
"LEFTWARD FROM TOP RIGHT"
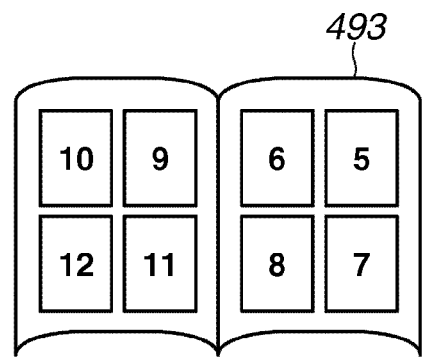

FIG.13
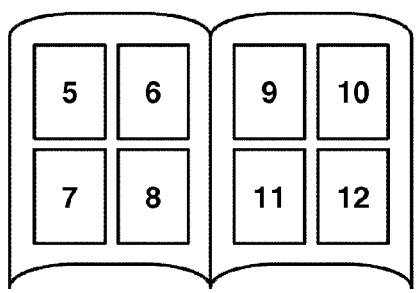 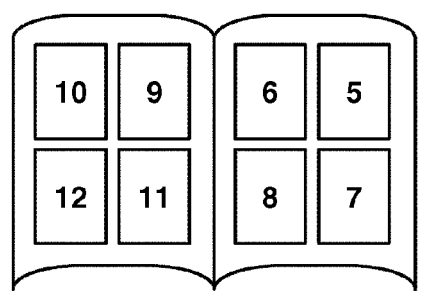
 LEFTWARD OPENING    →  IF OPENING DIRECTION IS CHANGED     RIGHTWARD OPENING
 RIGHTWARD FROM TOP LEFT    →  AUTOMATICALLY CHANGE ARRANGEMENT ORDER    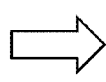 LEFTWARD FROM TOP RIGHT FIG.14
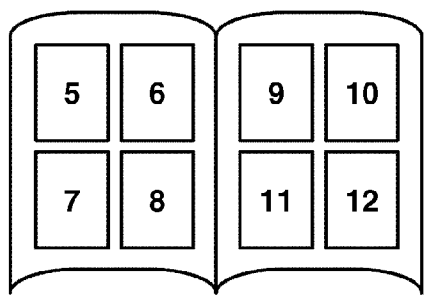 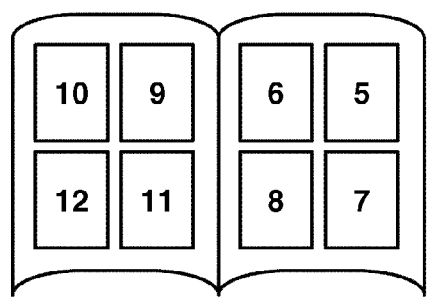
 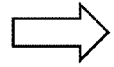 
IF ARRANGEMENT
ORDER IS CHANGED
 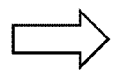 
AUTOMATICALLY
CHANGE
OPENING DIRECTION

FIG.15
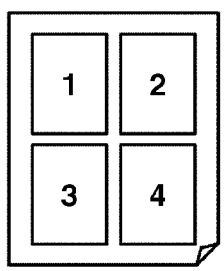 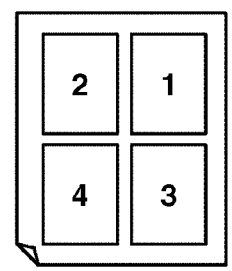
 LONG-SIDE BINDING (LEFT) 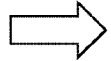 IF BINDING DIRECTION IS CHANGED  LONG-SIDE BINDING (RIGHT)
 RIGHTWARD FROM TOP LEFT 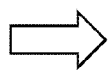 AUTOMATICALLY CHANGE ARRANGEMENT ORDER  LEFTWARD FROM TOP RIGHT

FIG.16
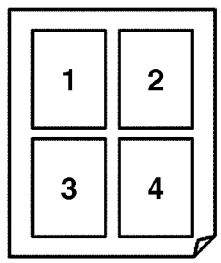 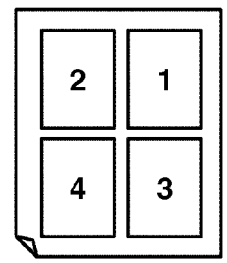
 RIGHTWARD FROM TOP LEFT 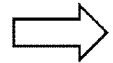  LEFTWARD FROM TOP RIGHT
IF ARRANGEMENT
ORDER IS CHANGED
 LONG-SIDE BINDING (LEFT) 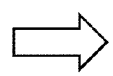  LONG-SIDE BINDING (RIGHT)
AUTOMATICALLY
CHANGE BINDING
DIRECTION

INFORMATION PROCESSING APPARATUS, CONTROL METHOD, AND STORAGE MEDIUM

BACKGROUND OF THE INVENTION

1. Field of the Invention

The present invention relates to a user interface for designating print setting information.

2. Description of the Related Art

Conventionally, a user can designate layout information called Nin1 as print setting information using a user interface (hereinafter referred to as UI) for a printer driver. Nin1 is a function of arranging a plurality of pages on a surface of one sheet by reducing the size of the pages, and printing the pages. To arrange and print two pages on a surface of one sheet is referred to as 2 in1, and to arrange and print four pages on a surface of one sheet is referred to as 4 in1. Further, the user can designate an "arrangement order" together with the layout information called Nin1. The arrangement order is information indicating in which order N pages are arranged on a surface of one sheet. Specific examples include "rightward from top left" and "leftward from top right".

On the other hand, the user can designate a printing method called bookbinding printing using a printer driver.

The bookbinding printing is a printing method for obtaining a printing result, in which pages are arranged according to page number, like a booklet. The bookbinding printing includes a method for arranging pages according to page number and printing the pages like a booklet when a plurality of stacked sheets is folded in the middle. The booklet is prepared by saddle stitching the plurality of sheets with a stapler. In the bookbinding printing, "leftward opening" or "rightward opening" is designated as an "opening direction". Another form of the bookbinding printing includes a method for folding one sheet in the middle, and stacking a plurality of sheets folded in the middle, to form a booklet. However, in the present application, a method for folding a plurality of stacked sheets in the middle, to form a booklet is used for description.

Further, the user can simultaneously designate Nin1 and bookbinding printing using the printer driver. More specifically, a booklet in which N pages are arranged in half of a sheet is output as a printing result. In the present invention, this is called Nin1 bookbinding. Japanese Patent Application Laid-Open No. 2010-171906 discusses a UI capable of easily performing Nin1 bookbinding in an easy-to-see state even by a user who is unaccustomed to a printing operation, for example.

While an "arrangement order" and an "opening direction" can be designated in the Nin1 bookbinding, as described above, a printing result, which is unnatural for a user, may be obtained depending on their combinations. For example, in an arrangement order "rightward from top left", "leftward opening" is natural, but "rightward opening" is unnatural. Similarly, in an arrangement order "leftward from top right", "rightward opening" is natural, but "leftward opening" is unnatural.

In Japanese Patent Application Laid-Open No. 2010-171906, an "opening direction" is selected, and an "arrangement order" is then designated by displaying the UI in a wizard format so that an unnatural printing result is not output. Therefore, the UI is not easily applied to a printer driver, which can be set in any order.

SUMMARY OF THE INVENTION

The present invention is directed to providing a setting screen that is easily operated by a user.

According to an aspect of the present invention, an information processing apparatus includes a setting unit configured to set bookbinding printing for outputting a book and a number of pages arranged on a surface of a sheet according to an instruction input via a setting screen, a first change unit configured, when both the bookbinding printing and the number of pages arranged on the surface of the sheet are set, in response to a change in an opening direction of the book, to change an arrangement order of pages arranged on the surface of the sheet to an arrangement order corresponding to the changed opening direction, and a second change unit configured, when both the bookbinding printing and the number of pages arranged on the surface of the sheet are set, in response to the change in the arrangement order, to change an opening direction of the book to a direction corresponding to the changed arrangement order.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 is a schematic view illustrating a printing result of Nin1 bookbinding.

FIG. 13 is a schematic view illustrating an example of an operation illustrated in FIG. 8.

FIG. 14 is a schematic view illustrating an example of an operation illustrated in FIG. 9.

FIG. 15 is a schematic view illustrating an example of an operation illustrated in FIG. 11.

FIG. 16 is a schematic view illustrating an example of an operation illustrated in FIG. 12.

DESCRIPTION OF THE EMBODIMENTS

Various exemplary embodiments, features, and aspects of the invention will be described in detail below with reference to the drawings.

Figure 1:
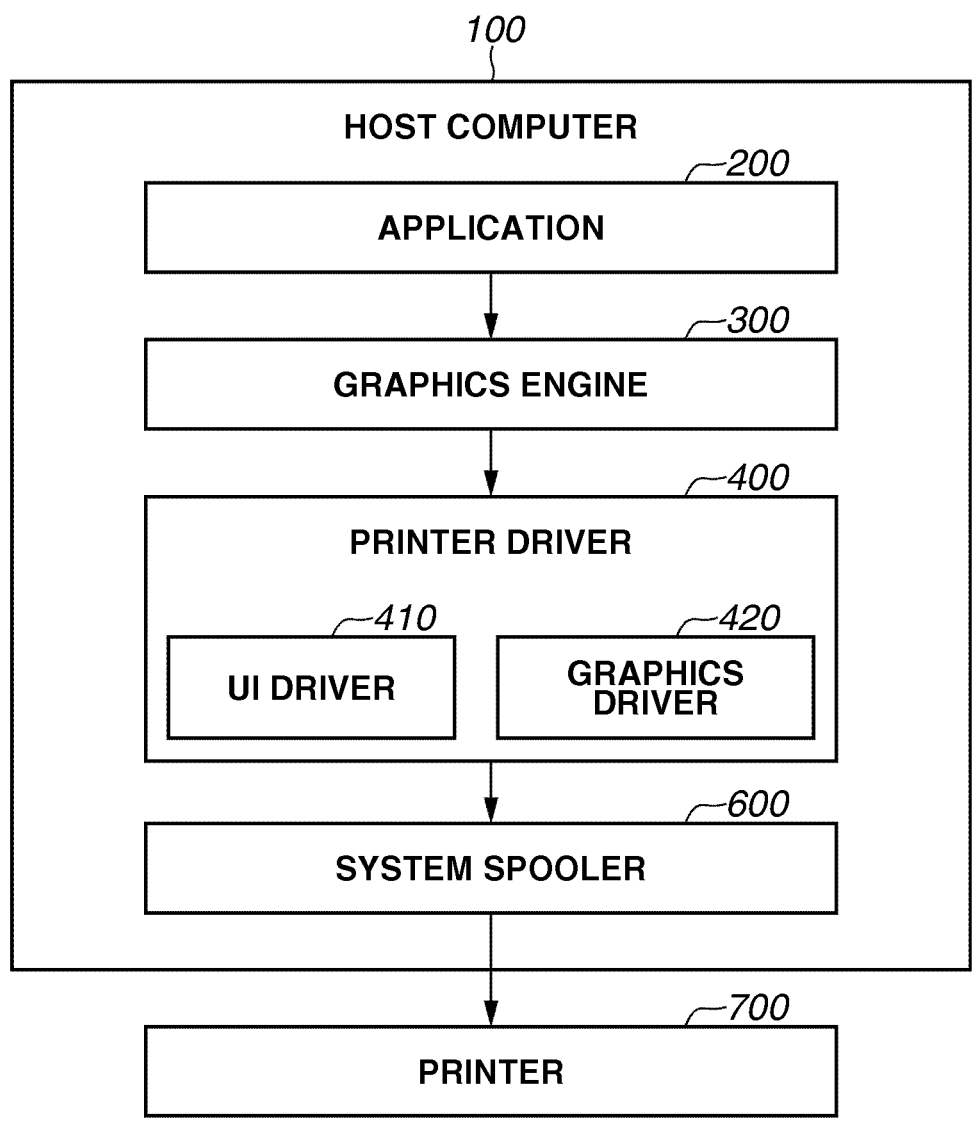
FIG. 1 illustrates a whole image of a printing system according to the present exemplary embodiment.

FIG. 1 illustrates a whole image of a printing system according to a first exemplary embodiment of the present invention. The printing system includes a host computer 100 and a printer 700. On the host computer 100, modules such as an application 200, a graphics engine 300 managed by an operating system, a printer driver 400, and a system spooler 600 are respectively operating. The application 200 specifically includes document generation software and spreadsheet software, and can accept a printing instruction from a user.

The application 200 issues a printing instruction such as a drawing instruction to the graphics engine 300 when it accepts the printing instruction from the user. The graphics engine 300, which has received the printing instruction, issues the printing instruction to the printer driver 400. The printer driver 400 converts the printing instruction from the graphics engine 300 into print data that can be interpreted by the printer 700, and sends the print data to the system spooler 600. The system spooler 600 sends the received print data to the printer 700. Finally, the printer 700 interprets the acquired print data, and performs print processing for a media such as a sheet. A method for the print processing includes fixing of toner on the media and discharging of ink. However, any method may be used in the exemplary embodiment of the present invention.

The printer driver 400 includes a UI driver 410 and a graphics driver 420. The UI driver 410 includes a UI for the user to designate print setting information such as two-sided setting and layout setting.

On the other hand, the graphics driver 420 converts a character drawing instruction and a graphics drawing instruction issued from the graphics engine 300 into print data that can be interpreted by the printer 700. The conversion is performed while referring to the print setting information designated by the UI driver 410. More specifically, when two-sided printing is designated in the print setting information, the printer 700 generates print data for performing two-sided printing.

Figure 17:
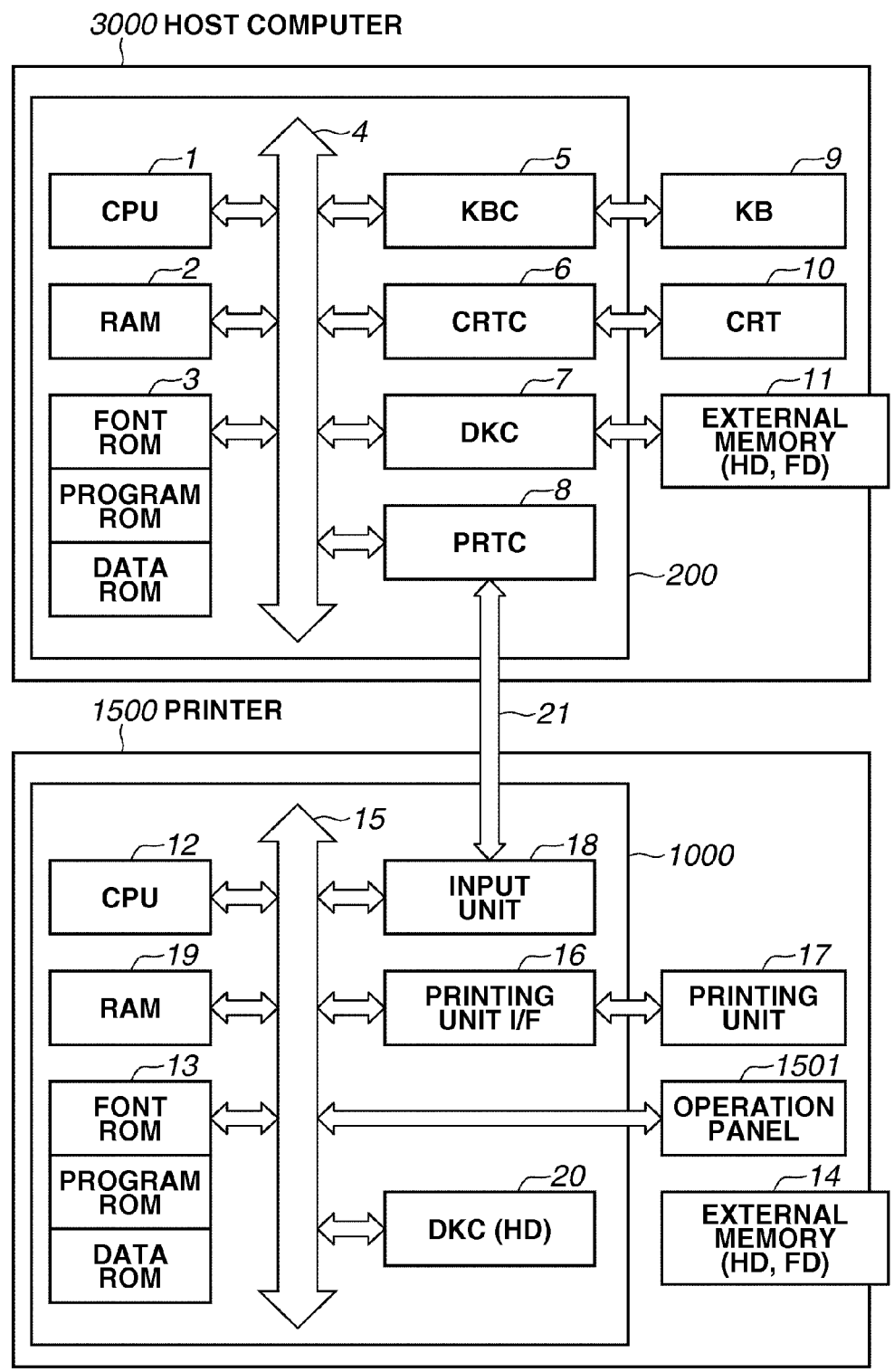
FIG. 17 illustrates a hardware configuration of an information processing apparatus and a printer.

FIG. 17 is a block diagram illustrating a configuration of an information processing apparatus according to the present invention. Unless specifically noted, the present invention is applicable to a system including a single device or a plurality of devices or a system that is connected via a network such as a local area network (LAN) or a wide area network (WAN) and performs processing as long as the functions of the present invention are implemented.

In FIG. 17, a host computer 3000 includes a central processing unit (CPU) 1 for processing a document including a mixture of graphics, images, characters, and tables (including spreadsheets, etc.) based on a document processing program stored in a program ROM in a read-only memory (ROM) 3 or an external memory 11. The CPU 1 collectively controls devices connected to a system bus 4. The program ROM in the ROM 3 or the external memory 11 stores an operating system program (hereinafter referred to as an OS) serving as a control program of the CPU 1. A font ROM in the ROM 3 or the external memory 11 stores font data used when the document processing is performed. A data ROM in the ROM 3 or the external memory 11 stores various types of data used when the document processing is performed.

A random access memory (RAM) 2 functions as a main memory, a work area, or the like for the CPU 1. A keyboard controller (KBC) 5 controls key input from a keyboard 9 or a pointing device (not illustrated). A cathode ray tube controller (CRTC) 6 controls display on a CRT display (CRT) 10. A disk controller (DKC) 7 controls access to the external memory 11 such as a hard disk (HD) or a floppy (registered trademark) disk (FD). The HD stores a boot program, various applications, an editing file, a printer control command generation program (hereinafter referred to as a printer driver), and so on.

A printer controller (PRTC) 8 is connected to a printer 1500 via a predetermined bidirectional interface 21, to control communication with the printer 1500.

The CPU 1 rasterizes an outline font to a display information RAM set on the RAM 2, for example, to enable "what you see in what you get (WYSIWYG)" on the CRT 10. The CPU 1 opens various windows registered based on a command designated using a mouse cursor or the like (not illustrated) on the CRT 10, to perform various types of data processing. The user can open, when performing printing, the window relating to print setting, to set a print processing method for the printer driver 400, including printer setting and selection of a printing function.

A CPU 12 in the printer 1500 (image processing apparatus) outputs an image signal serving as output information to a printing unit (printer engine) 17 connected to a system bus 15 based on a control program or the like stored in a ROM 13 or a control program or the like stored in an external memory 14. A program ROM in the ROM 13 stores the control program of the CPU 12. A font ROM in the ROM 13 stores font data used when the output information is generated. A data ROM in the ROM 13 stores information used in a host computer when the printer 1500 does not have the external memory 14 such as a hard disk (HD). The CPU 12 can communicate with the host computer 3000 via an input unit 18 and can notify the host computer 3000 of information in the printer 1500.

A RAM 19 functions as a main memory, a work area, or the like for the CPU 12, and has a memory capacity that can be expanded by an option RAM connected to an expansion port (not illustrated). The RAM 19 is used for an output information rasterization area, an environmental storage area, a non-volatile RAM (NVRAM), or the like. A memory controller (MC) 20 controls access to the external memory 14 such as a HD or an integrated circuit (IC) card. The external memory 14 is connected as an option, and stores font data, an emulation program, form data, and so on.

The input unit 18 includes a switch to be operated by the operation panel, described above, a light-emitting diode (LED) display, and so on. The number of external memories 14, described above, is not limited to one, but at least one. The plurality of external memories 14 storing option font cards and programs for interpreting printer control languages of different language systems in addition to built-in fonts, may be connected. Further, the external memory 14 may have an NVRAM (not illustrated) and store printer mode setting information from an operation panel 1501.

Figure 2:
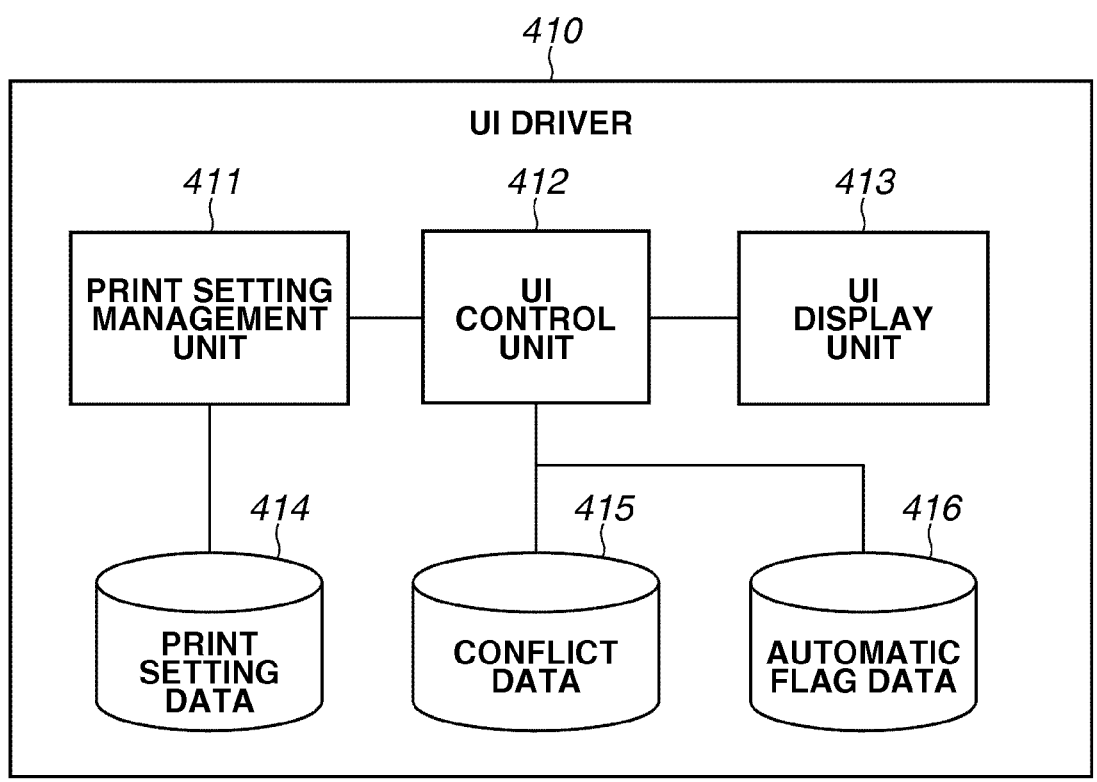
FIG. 2 illustrates a module configuration inside a UI driver.

FIG. 2 illustrates a module configuration of the UI driver 410 illustrated in FIG. 1. The above-mentioned print setting information is stored in print setting data 414 and is managed by a print setting management unit 411. A UI control unit 412 instructs a UI display unit 413 to display a UI based on the print setting data 414 managed by the print setting management unit 411. The UI display unit 413 displays the designated UI on a display device such as a display connected to the host computer 100. Further, the UI control unit 412 controls the UI while referring to conflict data 415 and automatic flag data 416 in response to an instruction from an input device such as a mouse or a keyboard connected to the computer 100. The conflict data 415 is data containing an exclusive relationship between a plurality of print setting information. More specifically, when the printer 700 does not support two-sided printing of a postcard, the exclusive relationship is described so that print setting information relating to postcard printing and print setting information relating to two-sided printing are exclusive. The UI control unit 412 controls the UI so that the exclusive print setting information cannot be simultaneously designated. The automatic flag data 416 has ON/OFF information, respectively, for an arrangement order and an opening direction in the present exemplary embodiment, and details thereof will be described below.

Figure 3:
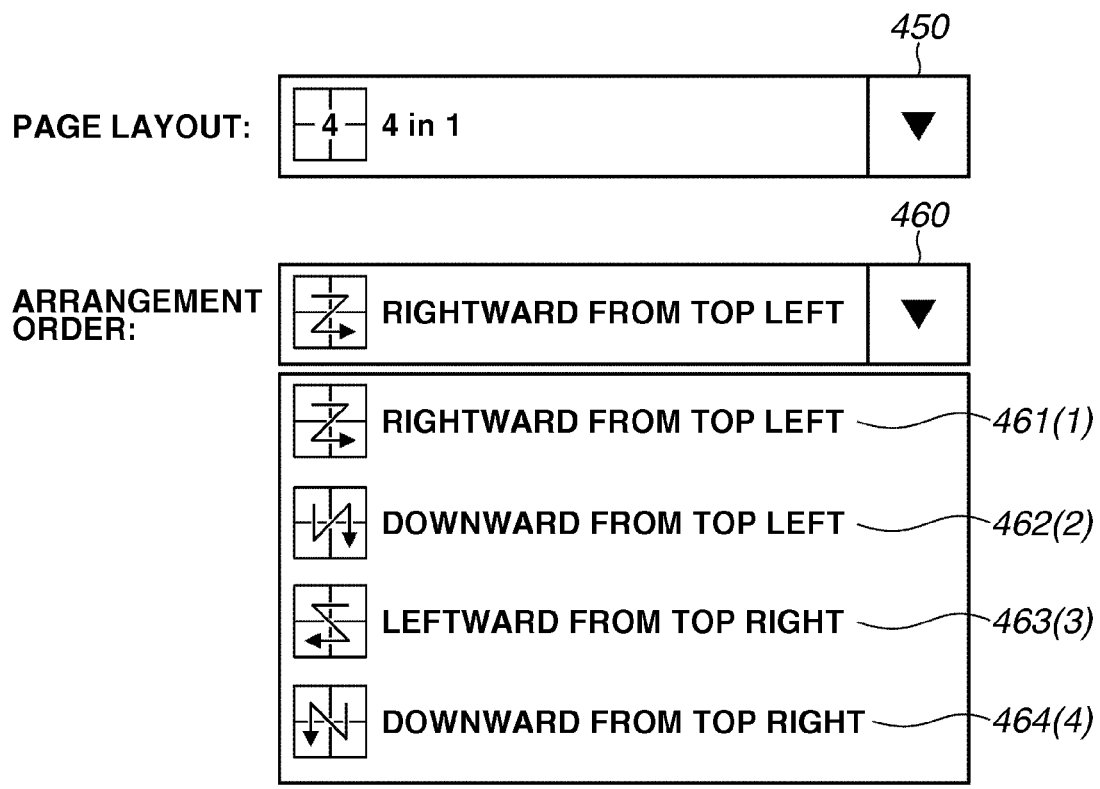
FIG. 3 illustrates a user interface for setting Nin1.
Figure 4:
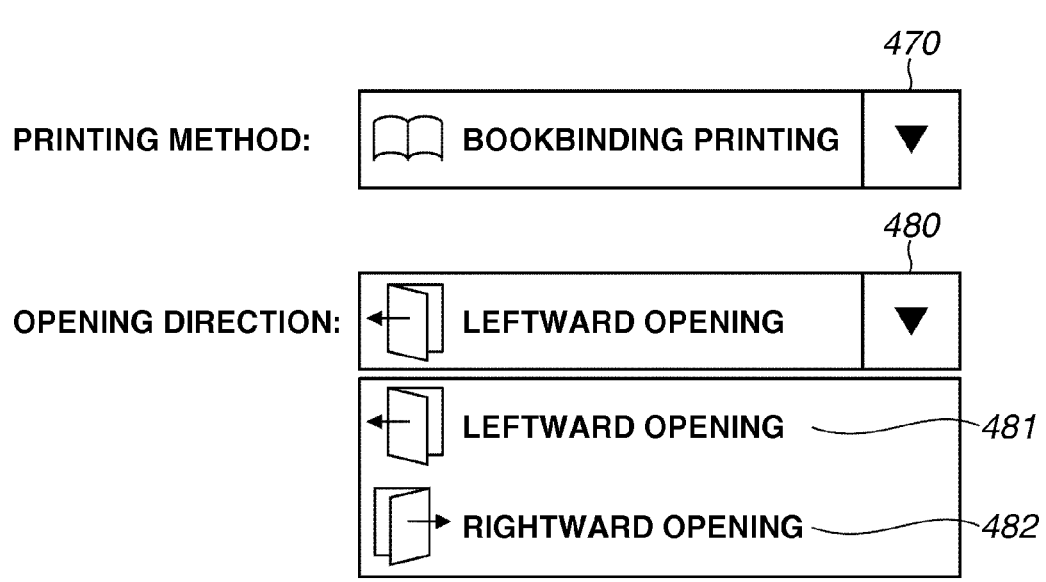
FIG. 4 illustrates a user interface for setting bookbinding printing.

FIGS. 3 and 4 illustrate a part of a UI (a setting screen) displayed by the UI display unit 413.

FIG. 3 illustrates a combo box 450 for setting Nin1 (the number of a plurality of pages arranged on a surface of a sheet) described in the conventional technique and a combo box 460 for designating an arrangement order. While an example in which 4 in1 is selected in the combo box 450 is illustrated, a user can also select 2 in1, 6 in1, 8 in1, or the like.

The user can select any of "rightward from top left" 461 (1), "downward from top left" 462 (2), "leftward from top right" 463 (3), and "downward from top right" 464 (4) using the combo box 460.

FIG. 4 illustrates a combo box 470 for setting a printing method and a combo box 480 for designating an opening direction. While bookbinding printing is selected in the combo box 470, the user can also select one-sided printing or two-sided printing. The user can select "leftward opening" 481 or "rightward opening" 482 in the combo box 480.

FIG. 5 illustrates an example of a printing result obtained when both Nin1 printing and bookbinding printing are designated on the UI illustrated in FIGS. 3 and 4. For example, a printing result 491 is obtained when both 4 in1 printing and bookbinding printing are designated, and "leftward opening" 481 and "rightward from top left" 461 (1) are respectively designated as an opening direction and an arrangement order. Four pages are printed on two facing pages of the printing result 491. A numeric character in a page refers to a page number. In this example, "leftward opening" 481 is designated. Therefore, fifth to eighth pages are printed on the left side, and the ninth to twelfth pages are printed on the right side. First to fourth pages are not illustrated because they are printed on a front cover (rear surface).

A printing result 492 is obtained when both 4 in1 printing and bookbinding printing are designated, and "rightward opening" 482 and "rightward from top left" 461 (1) are designated. A printing result 493 is obtained when both 4 in1 printing and bookbinding printing are designated, and "rightward opening" 482 and "leftward from top right" 463 (3) are designated. The printing result 491 and the printing result 493 correspond to a natural arrangement order described in the conventional technique, and the printing result 492 corresponds to an unnatural arrangement order described in the conventional technique.

Processing performed by the UI control unit 412 in the present exemplary embodiment will be described below with reference to flowcharts illustrated in FIGS. 6 to 9. Each of steps in the flowcharts according to the present exemplary embodiment is implemented when the CPU 1 reads out a related program from a memory and executes the program.

In step S501, the UI control unit 412 first acquires print setting data from the print setting management unit 411. In step S502, the UI control unit 412 displays a UI on which the acquired print setting data has been reflected.

In step S503, the UI control unit 412 sets an automatic flag representing an opening direction stored in the automatic flag data 416 to ON. In step S504, the UI control unit 412 also sets an automatic flag representing an arrangement order to ON.

Figure 6:
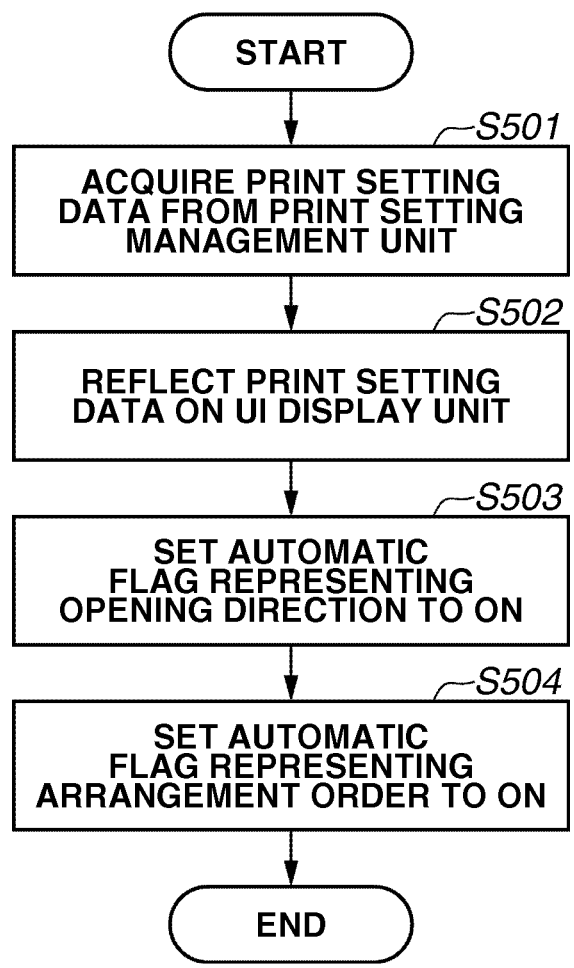
FIG. 6 is a flowchart for processing performed when a user interface is opened.
Figure 7:
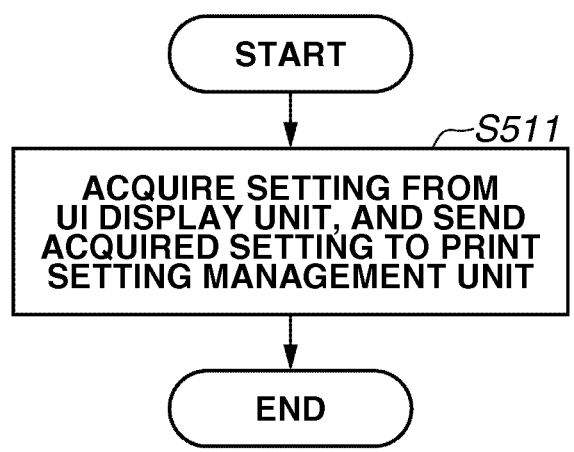
FIG. 7 is a flowchart for processing performed when a user interface is applied.

FIG. 7 is a flowchart for the processing performed by the UI control unit 412 when the user issues an instruction to change print setting information using the UI displayed in a flow illustrated in FIG. 6 and apply the changed print setting information.

In step S511, the UI control unit 412 acquires the changed print setting information, and sends the acquired print setting information to the print setting management unit 411. The print setting management unit 411 updates the print setting data 414 managed by itself upon receipt of the print setting information.

As illustrated in FIGS. 6 and 7, the UI control unit 412 stores the print setting information on the UI, in the print setting data 414, when it accepts an instruction to display the UI on which the print setting information stored in the print setting data 414 has been reflected and apply the print setting information via the UI.

Figure 8:
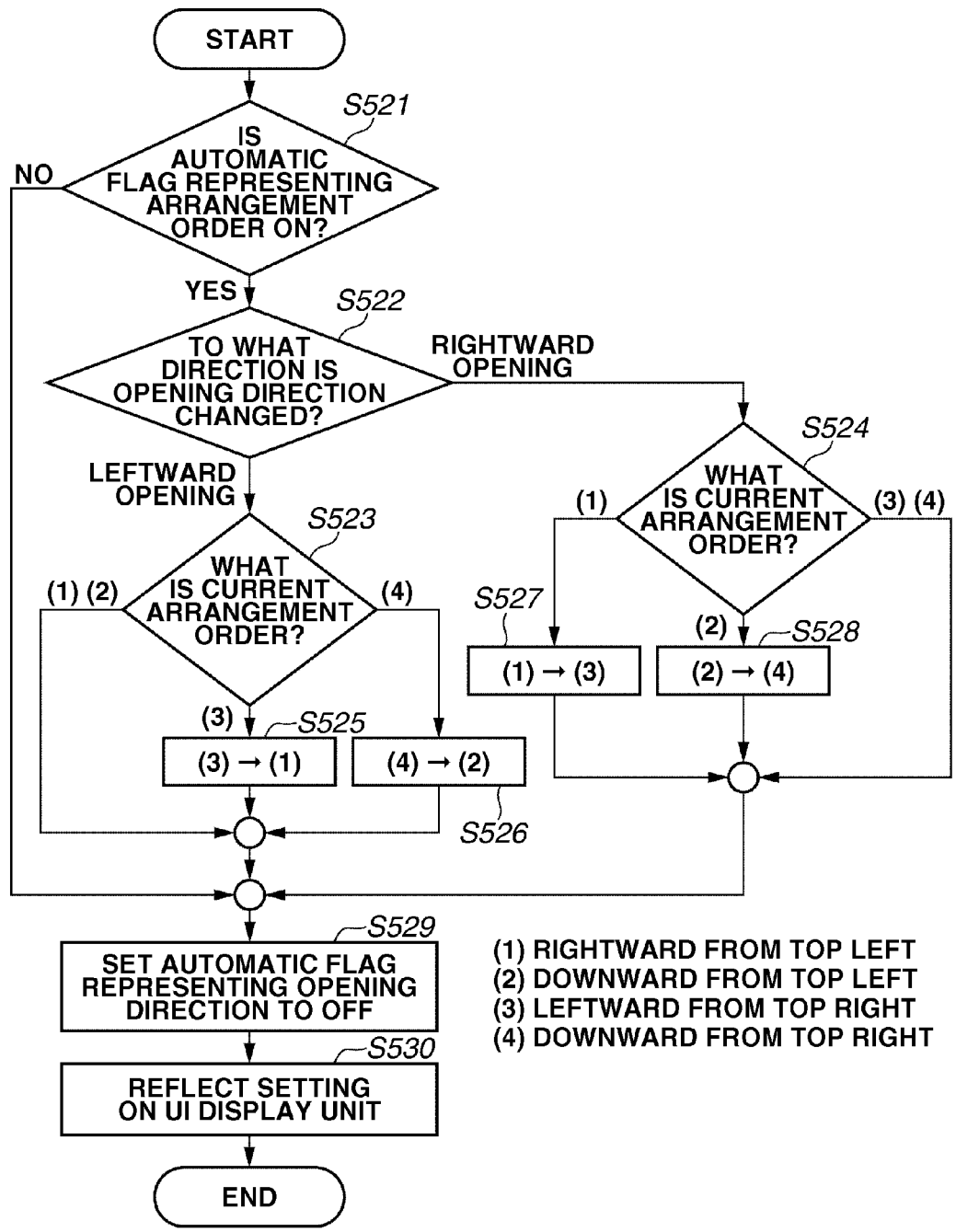
FIG. 8 is a flowchart for processing performed when a user has changed an arrangement order.
Figure 9:
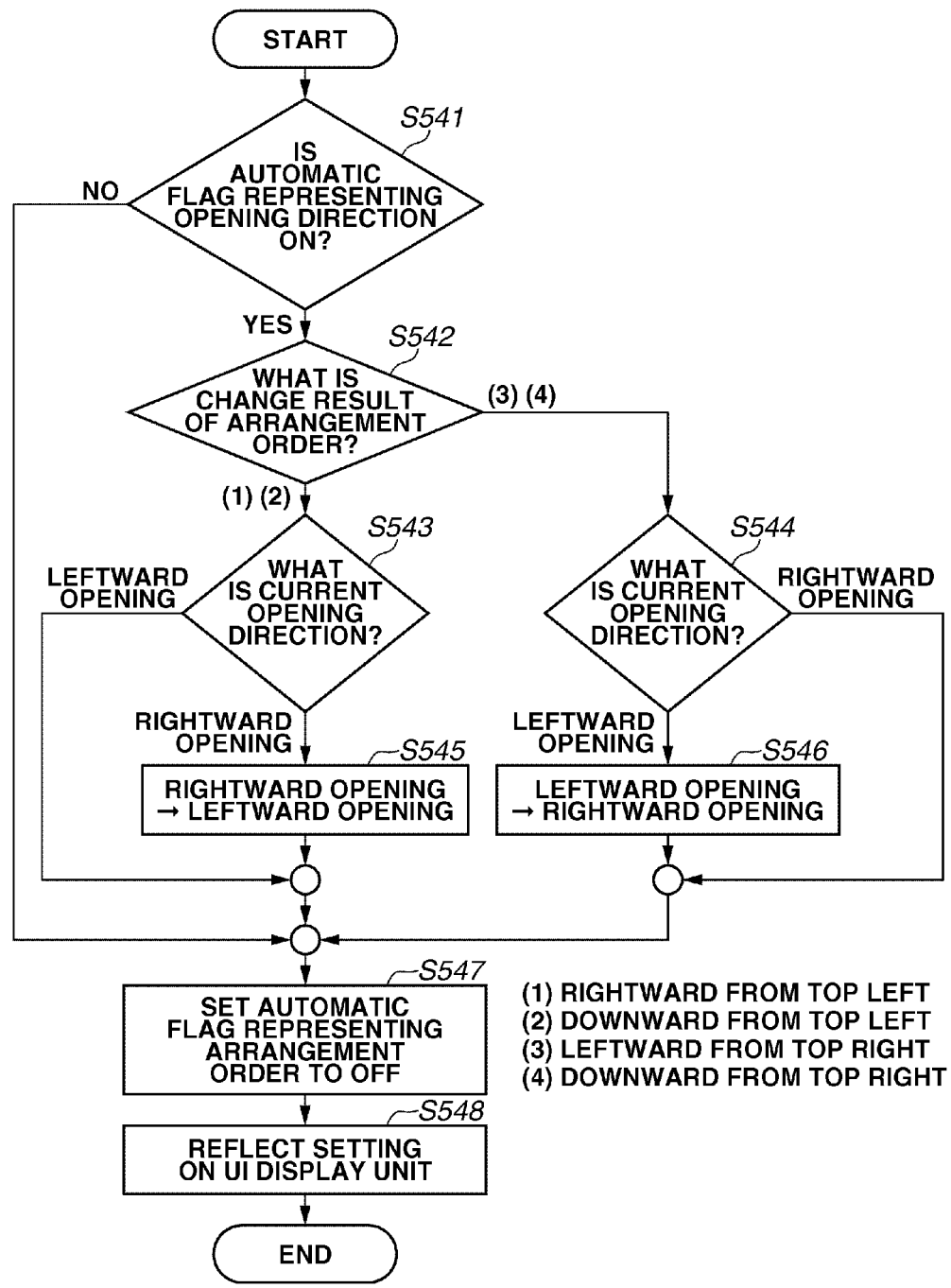
FIG. 9 is a flowchart for processing performed when a user has changed an opening direction.

FIGS. 8 and 9 are flowcharts for the processing performed by the UI control unit 412 when the user changes the opening direction 480 and the arrangement order 460 during Nin1 bookbinding in the exemplary embodiment of the present invention. The user changes the print setting information using the displayed UI. Therefore, flows illustrated in FIGS. 8 and 9 are performed between the flow illustrated in FIG. 6 and the flow illustrated in FIG. 7.

In step S521, the UI control unit 412 checks the automatic flag data 416, to confirm whether the automatic flag representing the arrangement order 460 is ON when the user changes the opening direction 480 in FIG. 8. Since the automatic flag representing the arrangement order 460 is ON (YES in step S521) immediately after the UI is displayed, as illustrated in FIG. 6, the processing proceeds to step S522. In step S522, the UI control unit 412 confirms a change result of the opening direction 480. If it is confirmed that the change result is "leftward opening" 481, the processing proceeds to step S523. In step S523, the UI control unit 412 then confirms the current arrangement order 460.

If it is confirmed that the current arrangement order 460 is a natural combination with "leftward opening" 481 (i.e., the arrangement order 460 is "rightward from top left" 416 (1) or "downward from top left" 462 (2)), the processing proceeds to step S529 without performing anything.

On the other hand, if it is confirmed that the current arrangement order 460 is an unnatural combination with leftward opening" 481 (i.e., the arrangement order 460 is "leftward from top right" 463 (3) or "downward from top right" 464 (4)), the processing proceeds to steps S525 and S526. In steps S525 and S526, the UI control unit 412 changes the arrangement order 460 to a natural combination with "leftward opening" 481.

More specifically, if "leftward from top right" 463 (3), together with "leftward opening" 481, is designated as the current arrangement order 460, the UI control unit 412 changes the arrangement order 460 from "leftward from top right" 463 (3) to "rightward from top left" 461 (1).

On the other hand, if "downward from top right" 464 (4), together with "leftward opening" 481, is designated as the current arrangement order 460, the UI control unit 412 changes the arrangement order 460 from "downward from top right" 464 (4) to "downward from top left" 462 (2).

If it is confirmed that a change result of the opening direction 480 is "rightward opening" 482 in step S522, the processing proceeds to step S524. In step S524, the UI control unit 412 also confirms the current arrangement order 460.

If it is confirmed that the current arrangement order is a natural combination with "rightward opening" 482 (i.e., the arrangement order 460 is "leftward from top right" 463 (3) or "downward from top right" 464 (4)), the processing proceeds to step S529 without performing anything.

On the other hand, if it is confirmed that the current arrangement order 460 is an unnatural combination with "rightward opening" 482 (i.e., the arrangement order 460 is "rightward from top left" 461 (1) or "downward from top left" 462 (2)), the processing proceeds to steps S527 and S528. In steps S527 and S528, the UI control unit 412 changes the arrangement order 460 to a natural combination with "rightward opening" 482.

More specifically, if "rightward from top left" 461 (1), together with "rightward opening" 482, is designated as the current arrangement order 460, the UI control unit 412 changes the arrangement order 460 from "rightward from top left" 461 (1) to "leftward from top right" 463 (3).

On the other hand, if "downward from top left" 462 (2), together with "rightward opening" 482, is designated as the current arrangement order 460, the UI control unit 412 changes the arrangement order 460 from "downward from top left" 462 (2) to "downward from top right" 464 (4).

In step S529, the UI control unit 412 sets the automatic flag representing the opening direction 480 in the automatic flag data 416 to OFF to store the fact that the opening direction 480 has been manually changed. In step S530, the UI control unit 412 displays the UI on which the changed print setting information has been reflected.

Thus, if the user changes the opening direction 480, the print setting information relating to the arrangement order 460 is changed to a natural combination with respect to the current opening direction 480 (an arrangement order corresponding to an opening direction after the change). As a result, a risk that the user involuntarily selects an unnatural combination can be reduced.

FIG. 13 illustrates a display state of the UI when steps S521, S522, S524, S527, S529, and S530 operate in this order in the flowchart illustrated in FIG. 8.

If the user changes the opening direction 480 from "leftward opening" 481 to "rightward opening" 482 in 4 in1 bookbinding, the UI control unit 412 changes the print setting information in the combo box 460 for designating the arrangement order from "rightward from top left" 461 (1) to "leftward from top right" 463 (3).

If the user changes the arrangement order 460 in FIG. 9, the processing proceeds to step S541. In step S541, the UI control unit 412 checks the automatic flag data 416, to confirm whether the automatic flag representing the opening direction 480 is ON. Since the automatic flag representing the opening direction 480 is ON (YES in step S541) immediately before the UI is displayed, the processing proceeds to step S542. Since the automatic flag representing the opening direction 480 is OFF (NO in step S529) when the user has already manually changed the opening direction 480, the processing proceeds to step S547. More specifically, the opening direction 480, which has been manually changed by the user once, is not automatically changed. In the flowchart illustrated in FIG. 8, the UI control unit 412 also determines that the arrangement order 460, which has been manually changed once, is not automatically changed in step S521.

In step S542, the UI control unit 412 confirms a change result of the arrangement order 460. If it is determined that the change result is "rightward from top left" 461 (1) or "downward from top left" 462 (2), the processing proceeds to step S543. In step S543, the UI control unit 412 confirms the current opening direction 480. If the current opening direction 480 is a natural opening direction (i.e., "leftward opening" 481) with the change result of the arrangement order 460 (i.e., "leftward from top left" 461 (1) or "downward from top left" 462 (2)), the processing proceeds to step S547 without performing anything.

On the other hand, if the current opening direction 480 is an unnatural opening direction (i.e., "rightward opening" 482) with the change result of the arrangement order 460 (i.e., "leftward from top left" 461 (1) or "downward from top left" 462 (2)), the processing proceeds to step S545. In step S545, the UI control unit 412 changes the current opening direction 480 from "rightward opening" 482 to "leftward opening" 481.

Similarly, if the change result of the arrangement order 460 is "leftward from top right" 463 (3) or "downward from top right" 464 (4), the processing proceeds to step S544. In step S544, the UI control unit 412 confirms the current opening direction 480. If the current opening direction is an unnatural opening direction (i.e., "leftward opening" 481) with the change result of the arrangement order 460 (i.e., "leftward from top right" 463 (3) or "downward from top right" 464 (4)), the processing proceeds to step S546. In step S546, the UI control unit 412 changes the current opening direction 480 from "leftward opening" 481 to "rightward opening" 482.

In step S547, the UI control unit 412 sets the automatic flag representing the arrangement order 460 in the automatic flag data 416 to OFF to store the fact that the arrangement order 460 has been manually changed. In step S548, the UI control unit 412 displays the UI on which the changed print setting information has been reflected.

FIG. 14 illustrates a display state of the UI when steps S541, S542, S544, S546, S547, and S548 operate in this order in the flowchart illustrated in FIG. 9.

If the user changes the arrangement order 460 from "rightward from top left" 461 (1) to "leftward from top right" 463 (3) in 4 in1 bookbinding, the UI control unit 412 changes the print setting information in the combo box 480 for designating the opening direction from "leftward opening" 481 to "rightward opening" 482.

As illustrated in FIGS. 8 and 9, the UI control unit 412 performs control not to automatically change the print setting information, when the user manually changes the opening direction 480 and the arrangement order 460, even if the other print setting information is changed by the determination in steps S521 and S541. When the user manually changes the opening direction 480 from "leftward opening" 481 to "rightward opening" 482 while the arrangement order 460 is "rightward from top left" 461 (1), the UI control unit 412 changes the arrangement order 460 from "rightward from top left" 461 (1) to "leftward from top right" 463 (3). If the user further changes the arrangement order 460 from "leftward from top right" 463 (3) to "rightward from top left" 461 (1), the opening direction 480 is also changed to "leftward opening" 481 to output a natural printing result.

If the user manually selects "rightward opening" 482, however, "rightward opening" 482 can be maintained even if the arrangement order 460 is "rightward from top left" 461 (1) to maintain a user's intension. The automatic flag data 416 is used for this control. When an automatic flag stored in the automatic flag data 416 is used, the user can set the print setting information for outputting an unnatural printing result such as the printing result 492 illustrated in FIG. 5, if he needs it. Therefore, a more flexible setting operation can be carried out while reducing a related risk.

As described above, according to the exemplary embodiment of the present invention, the user can obtain a natural combination by an automatic change even if the opening direction 480 and the arrangement order 460 are set in any order. Further, the setting can also be freely changed after being automatically made. The present exemplary embodiment is based on the premise that print data is vertically long (a portrait) to simplify the description. However, it can similarly be implemented even when the print data is horizontally long (a landscape). While 4in1 bookbinding has been mainly described, the present exemplary embodiment can similarly be implemented when 6 in1 bookbinding is used. While instead of "leftward opening" 481 and "rightward opening" 482, "upward opening" and "downward opening" can be set as the opening direction 480 depending on a direction and a value of N in Nin1, they may be both automatically changed to show a natural combination with respect to the arrangement order 460, so that a similar effect can be obtained.

Further, while ON and OFF of the automatic flag are represented as internal automatic flag data in the present exemplary embodiment, automatic and manual information can be displayed on the UI by an icon or the like so that operability of a setting operation by the user can be improved.

If the arrangement order 460 is automatically changed in response to the change in the opening direction 480 (or if the opening direction 480 is automatically changed in response to the change in the arrangement order 460), the UI control unit 412 may display a message indicating that the arrangement order 460 or the opening direction 480 has been automatically changed.

While a method for implementing the present invention for Nin1 bookbinding has been described in the first exemplary embodiment, a UI of an arrangement order and a binding direction is also controlled when instead of bookbinding printing, both two-sided printing and Nin1 are designated in a second exemplary embodiment.

When a binding margin in the binding direction is stapled, for example, a similar appearance to the binding printing is obtained in a simplified manner. When seen from such a viewpoint, the present exemplary embodiment can be implemented by replacing "leftward opening" 481 and "rightward opening" 482 in the first exemplary embodiment with "left binding" and "right binding" in the binding direction, to obtain a similar effect.

Figure 10:
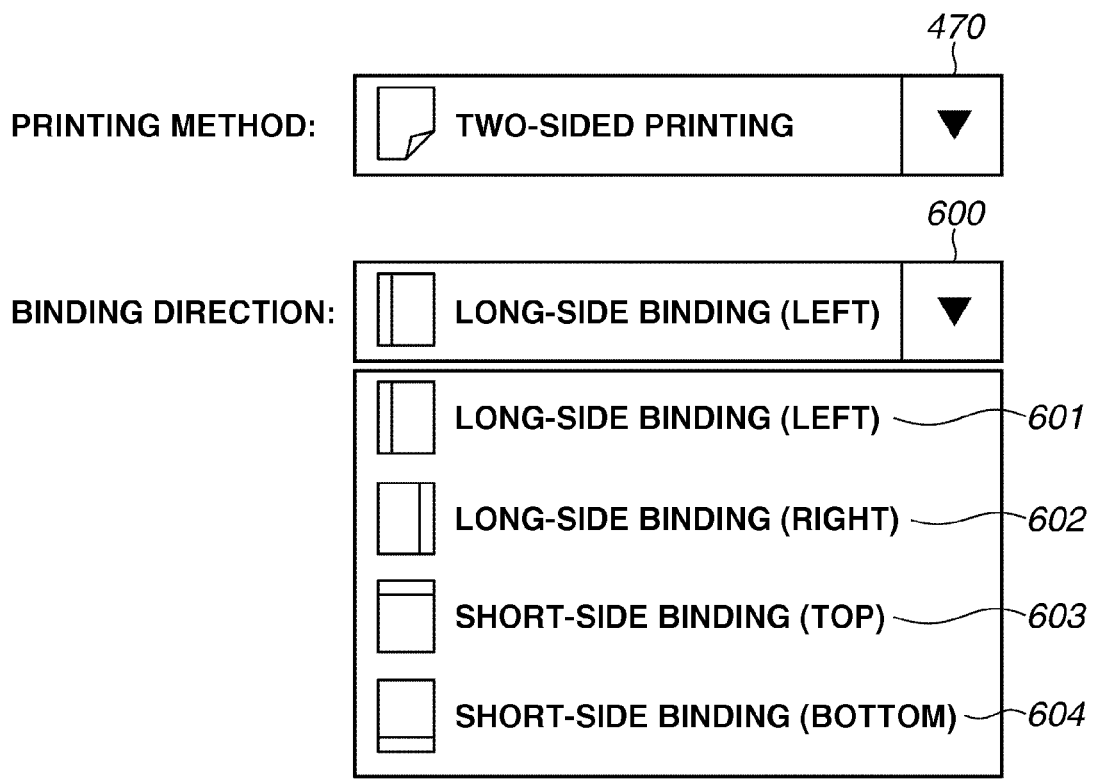
FIG. 10 illustrates a user interface for performing two-sided printing.

FIG. 10 illustrates that two-sided printing is selected in a combo box 470 for designating a printing method. Since the printing method is not bookbinding printing, a binding direction can be designated in a combo box 600. In the combo box 600, "long-side binding (left)" 601, "long-side binding (right)" 602, "short-side binding (up)" 603, and "short-side binding (down)" 604 can be selected. If two-sided printing is designated, the printer driver 400 generates print data so that the top and bottom of a front surface and a rear surface are determined depending on the binding direction designated in the combo box 600. When the width of the binding margin is designated, the printer driver 400 generates print data so that a margin corresponding to the width of the binding margin is generated in the designated binding direction.

Display processing of the UI by the UI control unit 412 in the second exemplary embodiment is almost similar to the processing illustrated in FIG. 6 and hence, description thereof is not repeated. The difference is that step S530 of setting the automatic flag representing the opening direction to ON is replaced with a step of setting an automatic flag representing the binding direction to ON in the second exemplary embodiment. A flowchart for the processing performed when print setting information is applied is similar to that illustrated in FIG. 7.

Figure 11:
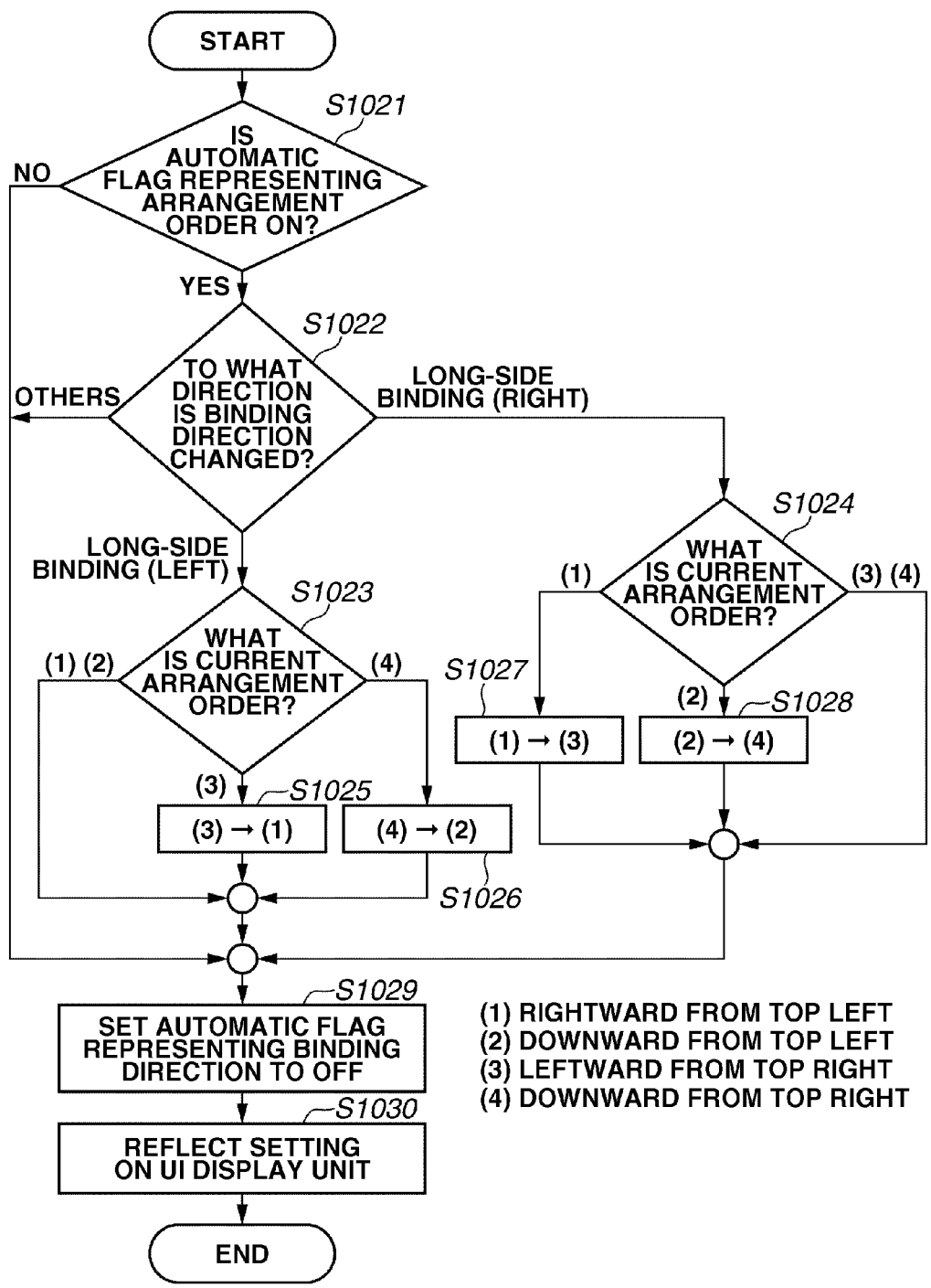
FIG. 11 is a flowchart for processing performed when a user has changed an arrangement order.
Figure 12:
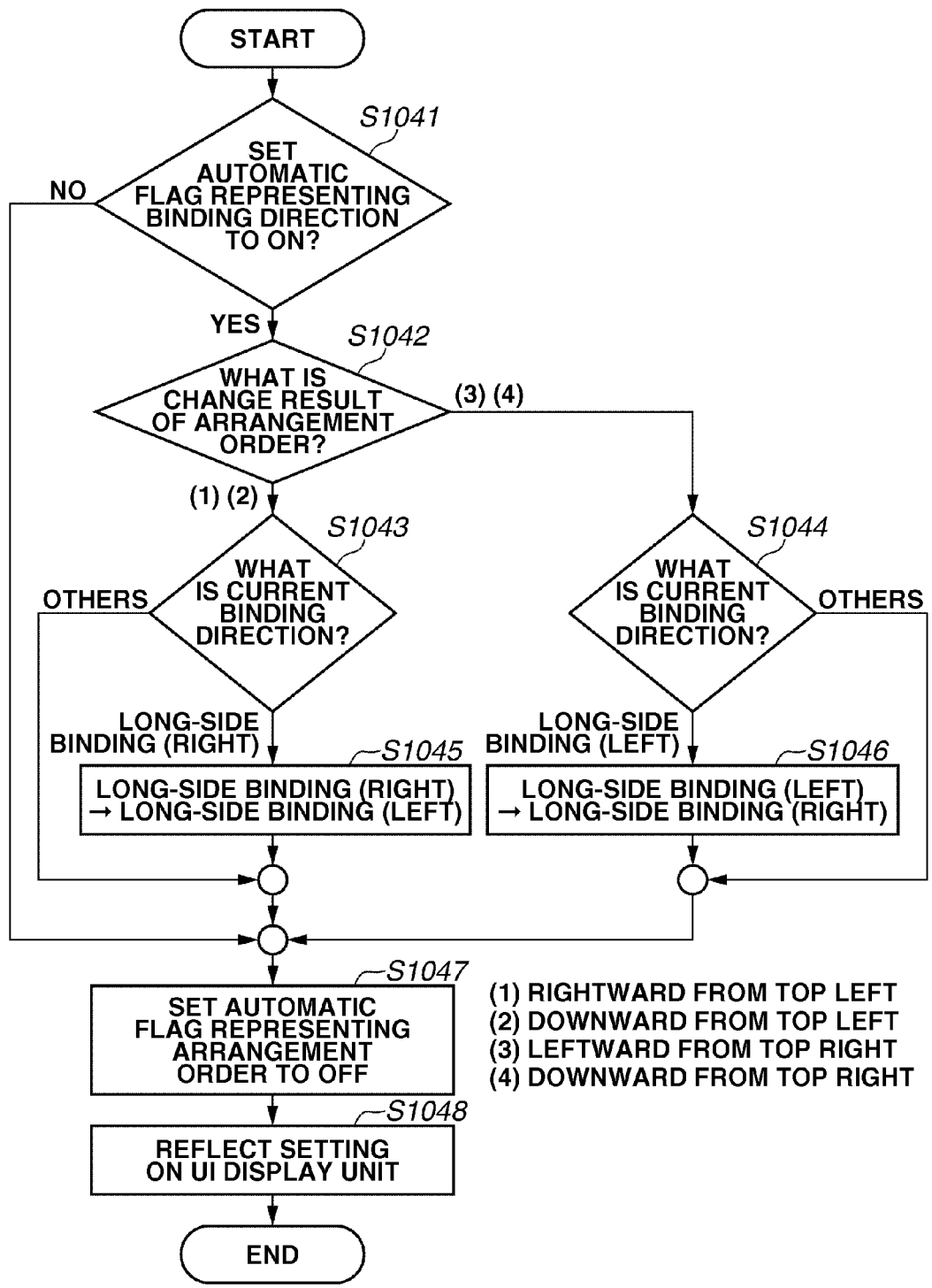
FIG. 12 is a flowchart for processing performed when a user has changed a binding direction.

FIGS. 11 and 12 are flowcharts for the processing performed by the UI control unit 412 when both two-sided printing and Nin1 are designated in the second exemplary embodiment.

FIG. 11 is a flowchart for the processing performed when the binding direction 600 is changed, which is basically similar to that illustrated in FIG. 8. In step S1022, "leftward opening" 481 and "rightward opening" 482 are respectively replaced with "long-side binding (left)" 601 and "long-side binding (right)" 602. When the binding direction 600 is changed to the other binding direction, e.g., "short-side binding (up)" 603, it is not unnatural in any arrangement order. Therefore, the arrangement order 460 is not changed, and the processing proceeds to step S1029.

On the other hand, when the binding direction 600 is changed to the other binding direction, e.g., "short-side binding (down)" 604, an arrangement order 640 for a natural option does not exist. Therefore, the arrangement order 460 is not changed, and the processing proceeds to step S1029.

In step S1029, the UI control unit 412 sets an automatic flag representing the binding direction 600 to OFF after the binding direction 600 has been manually changed.

FIG. 15 illustrates a display state of the UI when steps S1021, S1022, S1024, S1027, S1029, and S1030 operate in this order in the flowchart illustrated in FIG. 11.

If both 4in1 and two-sided printing are set, when the user changes the binding direction 600 from "long-side binding (left)" 601 to "long-side binding (right)" 602, the UI control unit 412 changes the combo box 460 for designating the arrangement order from "rightward from top left" 461 (1) to "leftward from top right" 463 (3).

FIG. 12 is a flowchart for the processing performed by the UI control unit 412 when the arrangement order 460 is changed, which is basically similar to that illustrated in FIG. 9 in the first exemplary embodiment, as previously described.

In step S1041, the UI control unit 412 confirms whether the automatic flag representing the binding direction 600 is ON. If the automatic flag is ON (YES in step S1041), the processing proceeds to step S1042. In step S1042, the UI control unit 412 confirms a change result of the arrangement order 460. In steps S1043 and S1044, the UI control unit 412 confirms the current binding direction 600. In steps S1045 and S1046, the UI control unit 412 changes the binding direction 600 to be a natural arrangement for the change result of the arrangement order 460. The content of the change is similar to that described in FIG. 9, and hence description thereof is not repeated.

FIG. 16 illustrates a display state of the UI when steps S1041, S1042, S1044, S1046, S1047, and S1048 operate in this order in the flowchart illustrated in FIG. 12.

If both 4in1 and two-sided printing are set, the UI control unit 412 changes the binding direction 600 from "long-side binding (left)" 601 to "long-side binding (right)" 602 when the user changes the arrangement order 460 from "rightward from top left" 461 (1) to "leftward from top right" 463 (3).

As described above, the present invention can be similarly implemented even during not only in a case of Nin1 bookbinding but also in a case of a combination of two-sided printing and Nin1 printing.

While the present invention has been described using the UI for the printer driver, it is not limited to the UI for the printer driver. For example, processing in the present invention may be applied to a UI for an application or an operation panel in a printer. A setting screen, which is easily operated by a user, can be provided by implementing the present invention.

OTHER EMBODIMENTS

Aspects of the present invention can also be realized by a computer of a system or apparatus (or devices such as a CPU, a micro processing unit (MPU), and/or the like) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., a computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-026358 filed Feb. 9, 2011, which is hereby incorporated by reference herein in its entirety.

What is claimed is:

1. An information processing apparatus comprising:
a setting unit configured to set bookbinding printing for outputting a book and a number of pages arranged on a surface of a sheet according to an instruction input via a setting screen; and
an arrangement order change unit configured, when both the bookbinding printing and the number of pages arranged on the surface of the sheet are set, in response to a change in an opening direction of the book, to automatically change an arrangement order of pages arranged on the surface of the sheet to an arrangement order corresponding to the changed opening direction.

2. The information processing apparatus according to claim 1, wherein, when the opening direction of the book is changed from a first opening direction to a second opening direction according to an instruction from a user, after the arrangement order is changed to a second arrangement order corresponding to the second opening direction, and then the user changes the second arrangement order to a first arrangement order, the second opening direction as the opening direction of the book is maintained.

3. The information processing apparatus according to claim 1, further comprising:
a display unit configured to display, according to the change of the arrangement order or the opening direction, a message indicating that the change has been made.

4. The information processing apparatus according to claim 1, further comprising an opening direction change unit configured, when both the bookbinding printing and the number of pages arranged on the surface of the sheet are set, in response to the change in the arrangement order, to change an opening direction of the book to a direction corresponding to the changed arrangement order.

5. The information processing apparatus according to claim 4, wherein, when the arrangement order is changed from a first arrangement order to a second arrangement order according to an instruction from a user, after the opening direction of the book is changed to a second opening direction corresponding to the second arrangement order, and then the user changes the second opening direction to the first opening direction, the second arrangement order as the arrangement order is maintained.

6. A control method performed in an information processing apparatus, the method comprising:
setting bookbinding printing for outputting a book and a number of pages arranged on a surface of a sheet according to an instruction input via a setting screen; and
an arrangement order change for automatically changing, when both the bookbinding printing and the number of pages arranged on the surface of the sheet are set, in response to a change in an opening direction of the book, an arrangement order of pages arranged on the surface of the sheet to an arrangement order corresponding to the changed opening direction.

7. The control method according to claim 6, wherein, when the opening direction of the book is changed from a first opening direction to a second opening direction according to an instruction from a user, after the arrangement order is changed to a second arrangement order corresponding to the second opening direction, and then the user changes the second arrangement order to the first arrangement order, the second opening direction as the opening direction of the book is maintained.

8. The control method according to claim 6, further comprising:
displaying, according to the change of the arrangement order or the opening direction, a message indicating that the change has been made.

9. The control method according to claim 6, further comprising, when both the bookbinding printing and the number of pages arranged on the surface of the sheet are set, in response to the change in the arrangement order, changing an opening direction of the book to a direction corresponding to the changed arrangement order.

10. The control method according to claim 9, wherein, when the arrangement order is changed from a first arrangement order to a second arrangement order according to an instruction from a user, after the opening direction of the book is changed to a second opening direction corresponding to the second arrangement order, and then the user changes the second opening direction to the first opening direction, the second arrangement order as the arrangement order is maintained.

11. A non-transitory storage medium storing a computer readable program for causing a computer to perform:
setting bookbinding printing for outputting a book and a number of pages arranged on a surface of a sheet according to an instruction input via a setting screen; and
an arrangement order change for automatically changing, when both the bookbinding printing and the number of pages arranged on the surface of the sheet are set, in response to a change in an opening direction of the book, an arrangement order of pages arranged on the surface of the sheet to an arrangement order corresponding to the changed opening direction.

12. The storage medium according to claim 11, wherein, when the opening direction of the book is changed from a first opening direction to a second opening direction according to an instruction from a user, after the arrangement order is changed to a second arrangement order corresponding to the second opening direction, and then the user changes the second arrangement order to the first arrangement order, the second opening direction as the opening direction of the book is maintained.

13. The storage medium according to claim 11, further comprising:
displaying, according to the change of the arrangement order or the opening direction, a message indicating that the change has been made.

14. The storage medium according to claim 11, further comprising, when both the bookbinding printing and the number of pages arranged on the surface of the sheet are set, in response to the change in the arrangement order, changing an opening direction of the book to a direction corresponding to the changed arrangement order.

15. The storage medium according to claim 14, wherein, when the arrangement order is changed from a first arrangement order to a second arrangement order according to an instruction from a user, after the opening direction of the book is changed to a second opening direction corresponding to the second arrangement order, and then the user changes the second opening direction to the first opening direction, the second arrangement order as the arrangement order is maintained.

16. An information processing apparatus comprising:
   a setting unit configured to set bookbinding printing for outputting a book and a number of pages arranged on a surface of a sheet according to an instruction input via a setting screen; and
   an opening direction change unit configured, when both the bookbinding printing and the number of pages arranged on the surface of the sheet are set, in response to the change in an arrangement order of pages arranged on the surface of the sheet, to automatically change an opening direction of the book to a direction corresponding to the changed arrangement order.

17. A control method performed in an information processing apparatus, the method comprising:
   setting bookbinding printing for outputting a book and a number of pages arranged on a surface of a sheet according to an instruction input via a setting screen; and
   automatically changing, when both the bookbinding printing and the number of pages arranged on the surface of the sheet are set, in response to the change in an arrangement order of pages arranged on the surface of the sheet, an opening direction of the book to a direction corresponding to the changed arrangement order.

18. A non-transitory storage medium storing a computer readable program for causing a computer to perform:
   setting bookbinding printing for outputting a book and a number of pages arranged on a surface of a sheet according to an instruction input via a setting screen; and
   automatically changing, when both the bookbinding printing and the number of pages arranged on the surface of the sheet are set, in response to the change in an arrangement order of pages arranged on the surface of the sheet, an opening direction of the book to a direction corresponding to the changed arrangement order.

* * * * *